United States Patent
Zhang

(10) Patent No.: US 10,963,153 B2
(45) Date of Patent: Mar. 30, 2021

(54) METHOD, APPARATUS, AND TERMINAL FOR SCREEN FLIPPING

(71) Applicant: TENCENT TECHNOLOGY (SHENZHEN) COMPANY LIMITED, Shenzhen (CN)

(72) Inventor: Banghua Zhang, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 807 days.

(21) Appl. No.: 14/260,962

(22) Filed: Apr. 24, 2014

(65) Prior Publication Data

US 2014/0237417 A1    Aug. 21, 2014

Related U.S. Application Data

(63) Continuation of application No. PCT/CN2012/077653, filed on Jun. 27, 2012.

(30) Foreign Application Priority Data

Oct. 26, 2011   (CN) .......................... 201110329299.1

(51) Int. Cl.
  *G06F 3/0488*   (2013.01)
  *G06F 3/0483*   (2013.01)

(52) U.S. Cl.
  CPC .......... *G06F 3/0488* (2013.01); *G06F 3/0483* (2013.01); *G06F 3/04883* (2013.01); *G06F 3/04886* (2013.01)

(58) Field of Classification Search
  CPC .. G06F 3/0488; G06F 3/0483; G06F 3/04883; G06F 3/04886

(Continued)

(56) References Cited

U.S. PATENT DOCUMENTS 8,347,232 B1 * 1/2013 Prud'Hommeaux ........................ G06F 3/0483 715/833
2002/0135602 A1 * 9/2002 Davis .................... G06F 3/0485 345/684

(Continued)

FOREIGN PATENT DOCUMENTS

CN   101340559 A1   1/2009
CN   101931687 A  * 12/2010

(Continued)

OTHER PUBLICATIONS

English language translation of International Search Report from PCT/CN2012/077653.

(Continued)

*Primary Examiner* — Arpan P. Savla
*Assistant Examiner* — Pritisha N Parbadia
(74) *Attorney, Agent, or Firm* — Brinks Gilson & Lione

(57) ABSTRACT

The present disclosure, pertaining to the field of information processing technologies, discloses a method, apparatus, and terminal for screen flipping. The method includes: detecting a screen touch action of a user, and after the screen touch action of the user is detected, determining a position area corresponding to the screen touch action; and performing screen flipping according to the determined position area and a corresponding relationship between the position area and a screen flipping operation. The apparatus for screen flipping includes a detecting module, a determining module, and a screen-flipping module. The terminal includes the apparatus for screen flipping. According to the present disclosure, a position area corresponding to a detected screen touch action of a user is determined, and screen flipping is performed according to the position area and a (Continued)

corresponding relationship between the position area and a screen flipping operation thereof.

12 Claims, 5 Drawing Sheets

(58) Field of Classification Search
USPC .......................................................... 715/781
See application file for complete search history.

(56) References Cited

U.S. PATENT DOCUMENTS

| | | | | |
|---|---|---|---|---|
| 2004/0010755 A1* | 1/2004 | Hamada | ................. | G06F 17/21 |
| | | | | 715/255 |
| 2007/0061755 A1* | 3/2007 | Taboada | ............... | G06F 3/0481 |
| | | | | 715/818 |
| 2008/0288887 A1 | 11/2008 | Wong et al. | | |
| 2009/0228901 A1* | 9/2009 | Beaver | ............... | G06F 3/04186 |
| | | | | 719/318 |
| 2010/0248788 A1* | 9/2010 | Yook | ..................... | G06F 3/0481 |
| | | | | 455/566 |
| 2011/0047491 A1* | 2/2011 | Hwang | ................ | G06F 3/0488 |
| | | | | 715/765 |
| 2011/0050591 A1* | 3/2011 | Kim | ..................... | G06F 3/0488 |
| | | | | 345/173 |
| 2011/0237303 A1* | 9/2011 | Matsuda | .............. | G06F 3/0485 |
| | | | | 455/566 |
| 2012/0102425 A1* | 4/2012 | Song | ................... | G06F 3/04855 |
| | | | | 715/776 |
| 2012/0185758 A1* | 7/2012 | Huang | ..................... | G09G 5/14 |
| | | | | 715/205 |
| 2012/0198330 A1* | 8/2012 | Koppel | ................ | G06F 40/114 |
| | | | | 715/251 |
| 2012/0317503 A1* | 12/2012 | Noh | .................... | G06F 3/04883 |
| | | | | 715/760 |
| 2014/0229838 A1* | 8/2014 | Xue | ................. | G06F 17/30126 |
| | | | | 715/728 |
| 2014/0380144 A1* | 12/2014 | Liang | ................ | G06F 17/30902 |
| | | | | 715/234 |

FOREIGN PATENT DOCUMENTS

| | | | | |
|---|---|---|---|---|
| CN | 101650630 B | | 8/2011 | |
| CN | 102222086 A | * | 10/2011 | ............. H04L 67/10 |
| CN | 103076964 B | | 6/2016 | |

OTHER PUBLICATIONS

Chinese Office Action dated Jan. 20, 2015.
Indonesian Office Action dated Oct. 13, 2017.

* cited by examiner

METHOD, APPARATUS, AND TERMINAL FOR SCREEN FLIPPING

This application is a continuation of International Application No. PCT/CN2012/077653, filed Jun. 27, 2012, which claims priority to Chinese Patent Application No. 201110329299.1, filed before the Chinese Patent Office on Oct. 26, 2011 and entitled "METHOD, APPARATUS, AND TERMINAL FOR SCREEN FLIPPING", the contents of each of which is incorporated herein by reference in its entirety.

TECHNICAL FIELD

The present disclosure relates to the field of information processing technologies, and in particular, to a method, apparatus, and terminal for screen flipping.

BACKGROUND

With the continuous development of sensing information technologies, "touching" and "flipping" become important elements determining whether a terminal is eye-catching. More and more mobile phone terminals or computer terminals are successively released to the market, boasting the "full touch screen" technology. The development of the touch technology brings much convenience to people. Instead of a keyboard, people can implement functions such as typing by merely touching on a screen. When browsing content by using a browser, a user may flip a screen more conveniently and quickly with the touch technology.

When the touch technology is used to implement screen flipping in the prior art, a slide distance of a user's finger on a screen is detected, and then a movement distance for flipping the screen is determined according to the slide distance, thereby implementing screen flipping.

During the implementation of the present disclosure, the inventor finds that the prior art has at least the following problems:

In the prior art, when screen flipping is implemented according to the slide distance of the user's finger on the screen, it is very difficult to accurately estimate the number of rows for screen flipping. Even through the number of rows can be determined, an error exists when the user's finger slides due to factors such as the shaking or the size of a contact area of the finger on the screen, resulting in that an inaccurate slide distance is detected. This causes inaccurate screen flipping, which is likely to cause a case where some rows are missed or some rows are presented more than once. This causes much inconvenience to the user.

SUMMARY

In order to implement screen flipping accurately, embodiments of the present disclosure provide a method, apparatus, and terminal for screen flipping. The technical solutions are as follows:

In one aspect, a method for screen flipping is provided, including:

detecting a screen touch action of a user, and after the screen touch action of the user is detected, determining a position area corresponding to the screen touch action; and performing screen flipping according to the determined position area and a corresponding relationship between the position area and a screen flipping operation.

Preferably, prior to the detecting a screen touch action of a user, the method further includes:

judging whether a current page is in read mode;

where correspondingly, the detecting the screen touch action of the user is performed after judging that the current page is in read mode.

The judging whether a current page is in read mode specifically includes:

judging whether all content of the current page is text; and if yes, judging that the current page is in read mode; otherwise; judging that the current page is in non-read mode.

Furthermore, prior to the performing screen flipping according to the determined position area and a corresponding relationship between the position area and a screen flipping operation, the method further includes:

splitting a screen to obtain one or more position areas, and setting a corresponding screen flipping operation for each position area to obtain the corresponding relationship between the position area and the screen flipping operation.

Preferably, after the splitting the screen to obtain one or more position areas, the method further includes:

displaying a margin of the position area in the form of a virtual desktop.

In another aspect, an apparatus for screen flipping is provided, including:

a detecting module, configured to detect a screen touch action of a user;

a determining module, configured to: after the detecting module detects the screen touch action of the user, determine a position area corresponding to the screen touch action; and a screen-flipping module, configured to perform screen flipping according to the position area determined by the determining module, and a corresponding relationship between the position area and a screen flipping operation.

Preferably, the apparatus further includes:

a judging module, configured to: before the detecting module detects the screen touch action of the user, judge whether a current page is in read mode;

where correspondingly, the detecting module is configured to: after the judging module judges that the current page is in read mode, detect the screen touch action of the user.

The judging module is specifically configured to judge whether all content of the current page is text; and if yes, judge that the current page is in read mode; otherwise; judge that the current page is in non-read mode.

Furthermore, the apparatus further includes:

a splitting module, configured to: before the screen-flipping module performs screen flipping according to the determined position area and the corresponding relationship between the position area and the screen flipping operation, split a screen to obtain one or more position areas, and set a corresponding screen flipping operation for each position area to obtain the corresponding relationship between the position area and the screen flipping operation.

Preferably, the apparatus further includes:

a displaying module, configured to: after the splitting module splits a screen to obtain one or more position areas, display a margin of the position area in the form of a virtual desktop.

In a further aspect, a terminal is further provided, where the terminal includes any one of the apparatuses for screen flipping described above.

The technical solutions provided in the embodiments of the present disclosure achieve the following beneficial effects:

A position area corresponding to a detected screen touch action of a user is determined, and screen flipping is performed according to the position area and a corresponding relationship between the position area and a screen flipping operation thereof. This may implement screen flipping accurately, improve user experience for the user in a read scenario, and enhance convenience for the user to perform interaction.

BRIEF DESCRIPTION OF THE DRAWINGS

For a better understanding of the technical solutions in the embodiments of the present disclosure, the accompanying drawings for illustrating the embodiments are briefly described below. Apparently, the accompanying drawings in the following description illustrate only some embodiments of the present disclosure, and persons of ordinary skill in the art can derive other accompanying drawings from these accompanying drawings without any creative efforts.

DETAILED DESCRIPTION

To make the objectives, technical solutions, and advantages of the present disclosure clearer, the embodiments of the present disclosure are described in detail below with reference to the accompanying drawings.

Figure 1:
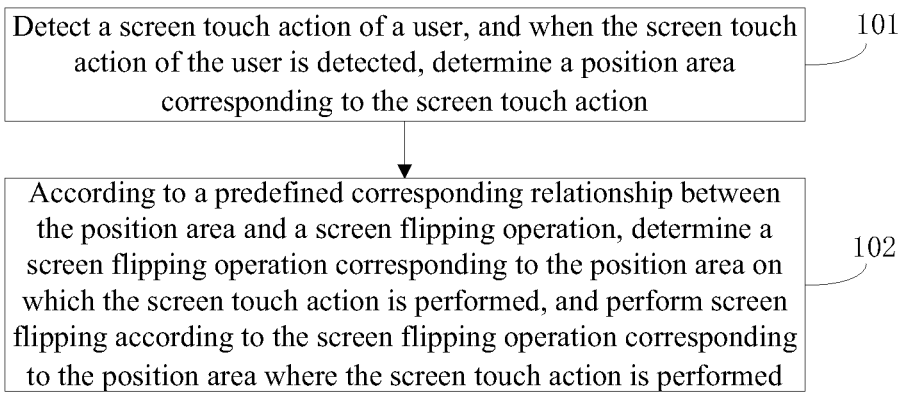
FIG. 1 is a flowchart of a method for screen flipping according to an embodiment of the present disclosure.

An embodiment of the present disclosure provides a method for screen flipping by taping a touch screen. Referring to FIG. 1, the method specifically includes the following steps:

101: Detecting a screen touch action of a user, and after the screen touch action of the user is detected, determining a position area corresponding to the screen touch action.

Preferably, prior to the detecting a screen touch action of a user, the method further includes:

judging whether a current page is in read mode;

where correspondingly, the detecting the screen touch action of the user is performed after judging that the current page is in read mode.

The judging whether a current page is in read mode specifically includes:

judging whether all content of the current page is text; and if yes, judging that the current page is in read mode; otherwise, judging that the current page is in non-read mode.

102: Performing screen flipping according to the determined position area and a corresponding relationship between the position area and a screen flipping operation.

Furthermore, prior to the performing screen flipping according to the determined position area and a corresponding relationship between the position area and a screen flipping operation, the method further includes:

splitting a screen to obtain one or more position areas, and setting a corresponding screen flipping operation for each position area to obtain the corresponding relationship between the position area and the screen flipping operation.

Preferably, after the splitting a screen to obtain one or more position areas, the method further includes:

displaying a margin of the position area in the form of a virtual desktop.

In the method provided in this embodiment, a position area corresponding to a detected screen touch action of a user is determined, and screen flipping is performed according to the position area and a corresponding relationship between the position area and a screen flipping operation thereof. This may implement screen flipping accurately, improve user experience for the user in a read scenario, and enhance convenience for the user to perform interaction.

Figure 2:
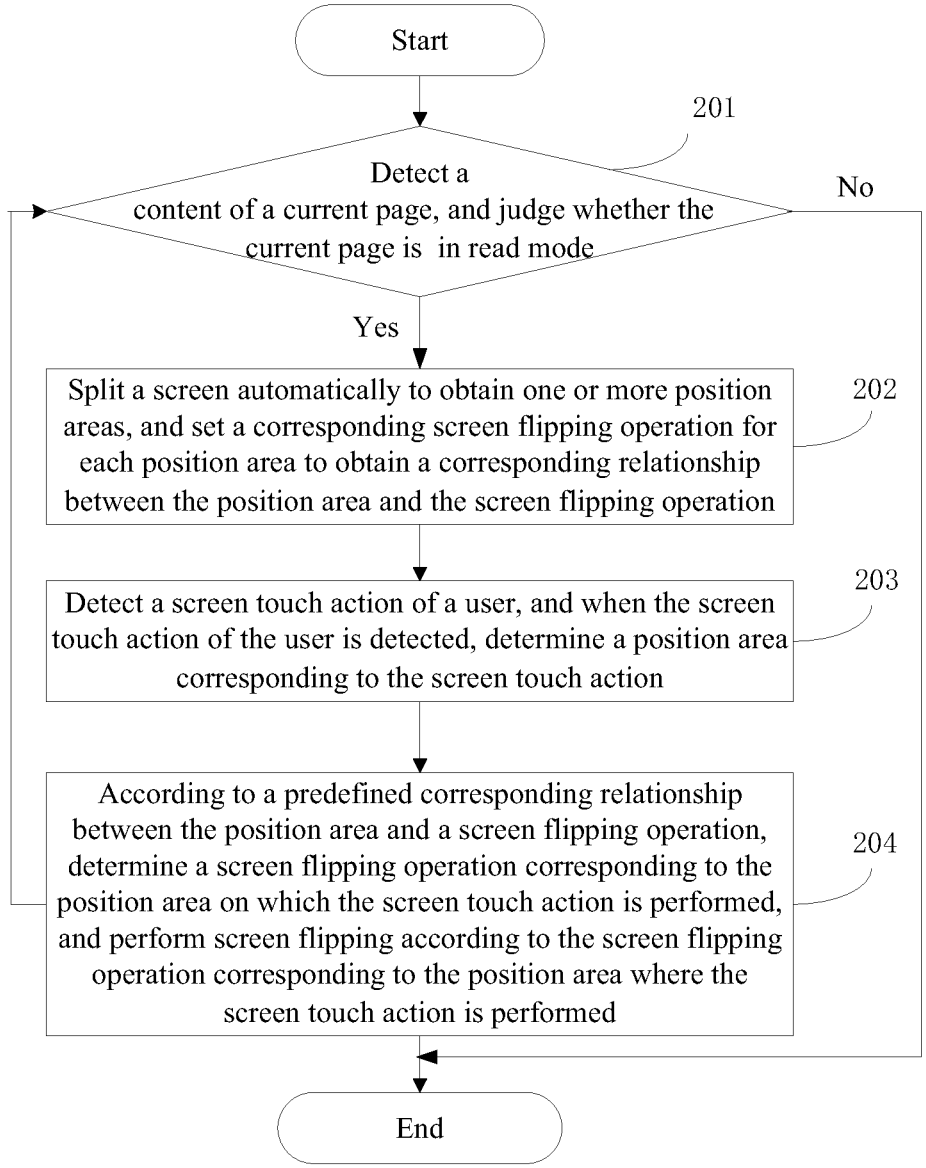
FIG. 2 is a flowchart of a method for screen flipping according to an embodiment of the present disclosure.

An embodiment of the present disclosure provides a method for screen flipping. For the convenience of description, this embodiment describes in detail the method provided in this embodiment by using an example where the method for screen flipping is implemented on a mobile phone terminal having a touch screen. Referring to FIG. 2, the method specifically includes the following steps:

201: Detecting a content of a current page; judging whether the current page is in read mode; and if yes, performing step 202; otherwise, ending the process.

As regards this step, this embodiment sets no limitation on manners of detecting the content of the current page opened by a user. This can be implemented by using an existing detecting technology because the existing detecting technology is mature. Similarly, this embodiment also is not limited on judging whether the current page is in read mode. In a specific implementation, this may be implemented by judging whether all content of the current page is text; and if yes, judging that the current page is in read mode; otherwise, judging that the current page is in non-read mode. For example, when a display range of the current page contains only text content but no other content such as an image, link, or video, it may be judged that the current page is in read mode.

202: Splitting a screen automatically to obtain one or more position areas, and setting a corresponding screen flipping operation for each position area to obtain a corresponding relationship between the position area and the screen flipping operation.

Specifically, this embodiment sets no specific limitation on manners of splitting the screen. The screen may be split into one or more position areas. When the screen is split into multiple position areas, the splitting may be performed in two modes, that is, perform splitting equally or unequally. Regardless of the splitting mode, when setting a corresponding screen flipping operation for a split position area, different screen flipping operations may be set for different position areas to obtain a corresponding relationship between the position areas and the screen flipping operations. Similarly, this embodiment sets no limitation on the screen flipping operations that are set for the position areas herein.

For example, the screen is split into one position area, and a corresponding screen flipping operation is set for the only one position area. To be specific, the screen flipping operation corresponding to the position area is set to flipping forward by one screen or backward by one screen.

For example, the screen is equally split into upper and lower position areas, where each position area is ½ area of the screen. These two position areas are referred to as an upper area and a lower area hereinafter respectively. The upper area is the upper ½ area of the screen, and the lower area is the lower ½ area of the screen. A screen flipping operation set for the upper area is flipping forward by one screen, and a screen flipping operation set for the lower area is flipping backward by one screen.

As another example, the screen is equally split into top, middle, and bottom position areas in a top-to-bottom direction, where each position area is ⅓ area of the screen. These three position areas are referred to as a top area, a middle area, and a bottom area for short respectively. The top area is the top ⅓ area of the screen; the middle area is the middle ⅓ area of the screen; and the bottom area is the bottom ⅓ area of the screen. A screen flipping operation set for the top area is flipping forward by one screen; a screen flipping operation set for the bottom area is flipping backward by one screen; and a screen flipping operation set for the middle area is performing no screen flipping, that is, no screen flipping operation is performed for the middle area. Hence, the middle area that performs no screen flipping operation may further be used to respond to existing routine operations on the screen, such as popping up a system menu, copying a web address, and displaying a link.

As still another example, the screen may be equally split into four position areas, which are referred to as an area 1, an area 2, an area 3, and an area 4 for short respectively from top to bottom. The area 1 is the top ¼ area of the screen; the area 2 is the middle ¼ area of the screen; the area 3 is the middle ¼ area of the screen; and the area 4 is the bottom ¼ area of the screen. A screen flipping operation set for the area 1 is flipping forward by one screen; a screen flipping operation set for the area 2 is flipping forward by ½ screen; a screen flipping operation set for the area 3 is flipping backward by ½ screen; and a screen flipping operation set for the area 4 is flipping backward by one screen.

As yet still another example, the screen may be unequally split into top, middle, and bottom position areas in a top-to-bottom direction, which are referred to as a top area, a middle area, and a bottom area for short respectively. The top area is the top ⅖ area of the screen; the middle area is the middle ⅕ area of the screen; and the bottom area is the bottom ⅖ area of the screen. A screen flipping operation set for the top area is flipping forward (backward) by one screen; a screen flipping operation set for the bottom area is flipping backward (forward) by one screen; a the screen flipping operation set for the middle area is performing no screen flipping, that is, no screen flipping operation is performed. Hence, the middle area that performs no screen flipping operation may further be used to respond to existing common operations on the screen, such as operations for popping up a system menu, copying a web address, and displaying a link. Nevertheless, the screen may also be unequally split into two, four, or more position areas, where a different screen flipping operation is set for each split position area.

Figure 3:
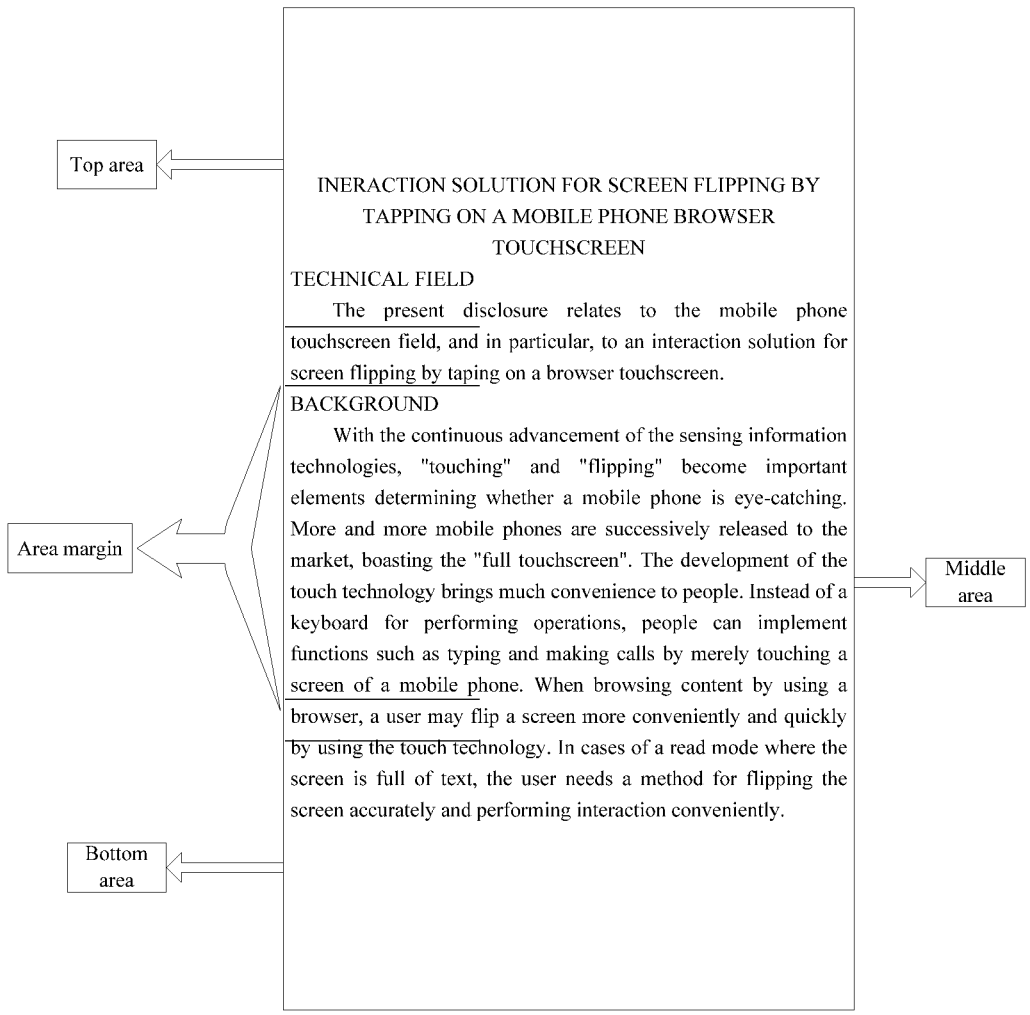
FIG. 3 is a virtual desktop of a terminal browser touch screen according to an embodiment of the present disclosure.

Preferably, in order to allow the user to specify the split position areas, the method provided in this embodiment further supports displaying a margin of the position area in the form of a virtual desktop, so that the user can determine more accurately a position area to be tapped, as shown in FIG. 3.

In addition, this step can be performed after or prior to the judging that the current page is in read mode in step 201. This embodiment sets no limitation on the sequence of performing this step, as long as it is performed prior to step 203. The description is provided herein by using an example where this step is performed after it is judged in step 201 that the current page is in read mode. It should be noted that after the corresponding relationship between the position area and the screen flipping operation is obtained in this step, when the method for screen flipping is performed the next time, the corresponding relationship obtained in this step may be used. In other words, this step is not necessarily performed each time the method for screen flipping is performed. Nevertheless, this embodiment sets no specific limitation on whether to perform this step each time the method for screen flipping is performed. If the corresponding relationship between the position area and the screen flipping operation needs to be reset, this step may be performed again to obtain the corresponding relationship between updated position area(s) and screen flipping operation(s).

203: Detecting a screen touch action of a user, and after the screen touch action of the user is detected, determining a corresponding position area.

As regards this step, this embodiment sets no limitation on specific manners of detecting the screen touch action of the user. This can be implemented by using an existing detecting technology because the existing technology is mature. The corresponding position area is determined according to the detected screen touch action of the user, where the position area is a position area on which the screen touch action of the user is performed.

In an example where the screen is split into top, middle, and bottom position areas in step 202 and the screen touch action of the user is performed on the top area, when the user taps any position of the top area, the position area is determined to be the top area. In the cases where the user taps multiple different position areas at the same time, it is allowed to perform no screen flipping operation or to perform other processing, for example, prompt the user to determine a selected position area. This embodiment sets no limitation on manners of prompting the user, and also sets no limitation on manners of tapping multiple different position areas by the user at the same time.

204: Performing screen flipping according to the determined position area and the corresponding relationship between the position area and the screen flipping operation, and returning to step 201.

Specifically, when performing screen flipping according to the determined position area and the corresponding relationship between the position area and the screen flipping operation, the screen flipping operation specifically corresponding to the position area corresponding to the screen touch action may be determined first according to the corresponding relationship between the position area and the screen flipping operation set in step 202, and then screen flipping is performed according to the determined screen flipping operation. In an example where the screen flipping operation corresponding to the determined position area is flipping forward by one screen, in this step, the screen is flipped forward by one screen according to the position area and the corresponding relationship between the position area and the screen flipping operation. If the screen flipping operation corresponding to the determined position area is flipping backward by one screen, in this step, the screen is flipped backward by one screen according to the corresponding relationship between the position area and the screen flipping operation. A page content of the current page changes each time the screen flipping is performed regardless of how the screen flipping is performed according to the determined position area and the corresponding relationship between the position area and the screen flipping operation, and the current page enters a non-read mode when exiting the read mode, which may end the process of the method for screen flipping; therefore, it is necessary to detect the content of the current page again each time the screen flipping operation is completed, that is, return to step 201. Nevertheless, as regards the execution of the method for screen flipping for one time, the screen flipping process may be ended after this step.

In the method for screen flipping provided in this embodiment, a current page is judged to determine whether it is in read mode; and if the current page is in read mode, a screen touch action of a user is detected; a position area corresponding to the screen touch action is determined; and screen flipping is performed according to the determined position area and a corresponding relationship between the position area and a screen flipping operation. This may implement screen flipping accurately, improve user experience for the user in a read scenario, and enhance convenience for the user to perform interaction.

Figure 4:
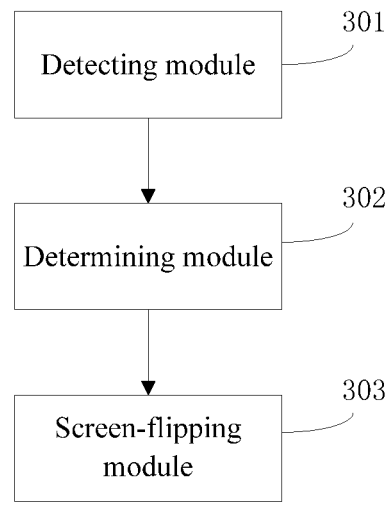
FIG. 4 is a schematic structural diagram of a first apparatus for screen flipping according to an embodiment of the present disclosure.

An embodiment of the present disclosure provides an apparatus for screen flipping, where the apparatus for screen flipping is configured to perform the method for screen flipping illustrated in the embodiments described above. Referring to FIG. 4, the apparatus for screen flipping includes:

a detecting module 301, configured to detect a screen touch action of a user;

a determining module 302, configured to: after the detecting module 301 detects the screen touch action of the user, determine a position area corresponding to the screen touch action; and a screen-flipping module 303, configured to perform screen flipping according to the position area determined by the determining module 302, and a corresponding relationship between the position area and a screen flipping operation.

For details about a manner of detecting the screen touch action of the user by the detecting module 310, reference may be made to the related description of step 201 in the above-described embodiment, which is not described herein any further. For details about a manner of determining the position area corresponding to the screen touch action by the determining module 302, reference may be made to the related description of step 203 in above-described embodiment, which is not described herein any further. For details about a manner of performing screen flipping by the screen flipping module 303 according to the position area determined by the determining module 302 and the corresponding relationship between the position area and the screen flipping operation, reference may be made to the related description of step 204 in above-described embodiment, which is not described herein any further.

Figure 5:
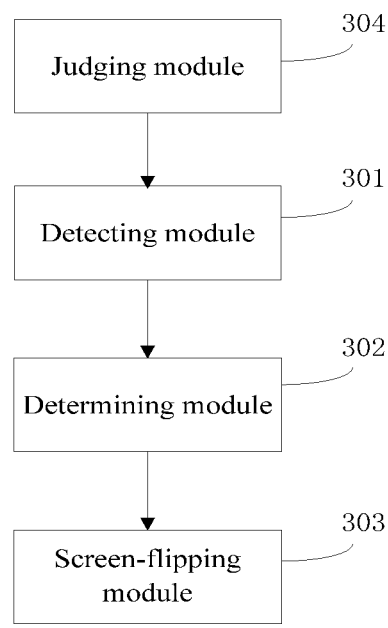
FIG. 5 is a schematic structural diagram of a second apparatus for screen flipping according to an embodiment of the present disclosure.

Referring to FIG. 5, the apparatus for screen flipping further includes:

a judging module 304, configured to: before the detecting module 301 detects the screen touch action of the user, judge whether a current page is in read mode;

where correspondingly, the detecting module 301 is configured to: after the judging module 304 judges that the current page is in read mode, detect the screen touch action of the user.

Specifically, with reference to the related description of step 201 in above-described embodiment, the judging module 304 is specifically configured to: judge whether all content of the current page is text; and if yes, judge that the current page is in read mode; otherwise, judge that the current page is in non-read mode.

Figure 6:
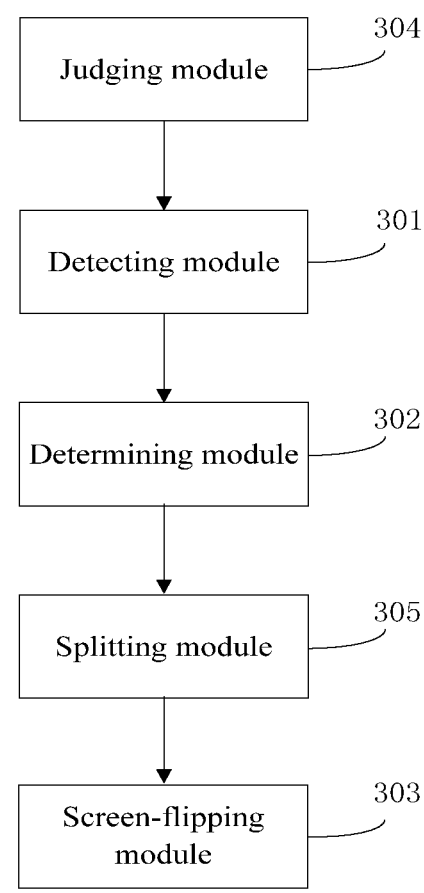
FIG. 6 is a schematic structural diagram of a third apparatus for screen flipping according to an embodiment of the present disclosure.

Furthermore, with reference to the related description of step 202 in above-described embodiment, referring to FIG. 6, the apparatus for screen flipping further includes:

a splitting module 305, configured to: before the screen-flipping module 303 performs screen flipping according to the determined position area and the corresponding relationship between the position area and the screen flipping operation, split a screen to obtain one or more position areas, and set a corresponding screen flipping operation for each position area to obtain the corresponding relationship between the position area and the screen flipping operation.

Figure 7:
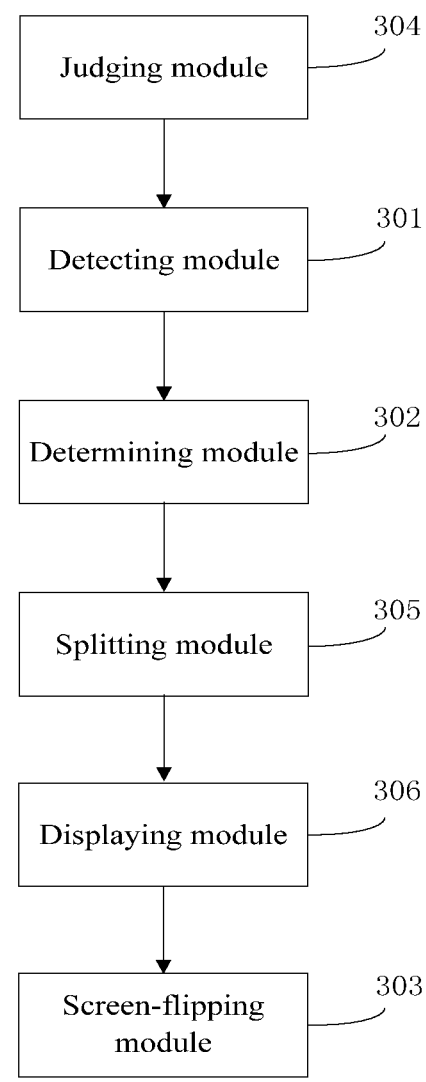
FIG. 7 is a schematic structural diagram of a fourth apparatus for screen flipping according to an embodiment of the present disclosure.

Furthermore, with reference to the related description of step 202 in above-described embodiment, referring to FIG. 7, the apparatus for screen flipping further includes:

a displaying module 306, configured to: after the splitting module 305 splits the screen to obtain one or more position areas, display a margin of the position area in the form of a virtual desktop.

According to the apparatus for screen flipping provided in this embodiment, a position area corresponding to a detected screen touch action of a user is determined, and screen flipping is performed according to the position area and a corresponding relationship between the position area and a screen flipping operation thereof. This may implement screen flipping accurately, improve user experience for the user in a read scenario, and enhance convenience for the user to perform interaction.

An embodiment of the present disclosure provides a terminal, where the terminal includes the apparatus for screen flipping provided in above-described embodiment.

The terminal may specifically be a mobile phone, a computer, or other terminals. This embodiment sets no limitation on specific product forms of the terminal.

According to the terminal provided in this embodiment, a position area corresponding to a detected screen touch action of a user is determined by using an apparatus for screen flipping, and screen flipping is performed according to the position area and a corresponding relationship between the position area and a screen flipping operation thereof. This implements screen flipping accurately, improves user experience for the user in a read scenario, and enhances convenience for the user to perform interaction.

It should be noted that, when screen flipping is performed by using the apparatus for screen flipping provided in this embodiment, the division of the functional modules are described as an example. In an actual application, the functions may be performed by different functional modules according to actual requirements. That is, the internal structure of the apparatus is divided into different functional modules to implement all or a part of functions described above. In addition, the apparatus for screen flipping and the terminal described in this embodiment are based on the same inventive concept as embodiments of the method for screen flipping. Therefore, the specific implementation can refer to the description of the method embodiments of the present disclosure, which is not described herein any further.

A person skilled in the art may clearly understand that the apparatus embodiment described above is merely illustrative, and the units/modules are divided merely according to logic functions thereof, where other division manners are available in practice. For example, the functional units/modules may be integrated on one processing unit/module, or the each unit/module exists separately and physically, or two or more units/modules are integrated on one unit/module. The integrated unit/module may be implemented by hardware or by a software functional unit/module.

A person skilled in the art should understand that all or part of steps of the preceding embodiments may be implemented by hardware or hardware following instructions of programs. The programs may be stored in a non-transitory computer-readable storage medium and may be executed by at least one processor. The storage medium may be a read-only memory, a magnetic disk, or a compact disc-read only memory.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for screen flipping, comprising:
   judging whether a current pace is in a read mode, wherein the judging comprises a determination that a display range of the current page does not include at least one of an image, a link, or a video;
   detecting a screen touch action of a user after judging that the current page is in the read mode, and determining a position area corresponding to the screen touch action after the screen touch action of the user is detected, wherein, the determined position area is one of at least four equally sized position areas of the display range of the current page splitting the display range of the current page into equal sized quarters, wherein a first position area is a top quarter area of the screen and corresponds to a first screen flipping operation of flipping forward by one screen, wherein a second position area is a middle quarter area of the screen directly below the first position area and corresponds to a second screen flipping operation of flipping forward by a preset percentage of the display range that is less than 100%, wherein a third position area is another middle quarter area of the screen directly below the second position area and corresponds to a third screen flipping operation of flipping backward by a preset percentage of the display range that is less than 100%, and wherein a fourth position area is a bottom quarter area of the screen directly below the third position area and corresponds to a fourth screen flipping operation of flipping backward by one screen; and
   performing one of the first, second, third, or fourth screen flipping operations according to the determined position area and a corresponding relationship between the determined position area and the one of the first, second, third, or fourth screen flipping operations.

2. The method according to claim 1, wherein prior to the performing screen flipping according to the determined position area and a corresponding relationship between the position area and a screen flipping operation, the method further comprises: splitting a screen to obtain the four position areas arranged from top to bottom of the display range of the current page, and setting a corresponding screen flipping operation for each position area to obtain the corresponding relationship between the position area and the screen flipping operation.

3. The method according to claim 1, wherein the method further comprises:
   displaying a margin of the at least four position areas in the form of a virtual desktop.

4. An apparatus for screen flipping comprising: at least a processor; and at least a computer readable storage medium containing instructions of programs that, when executed by the processor, cause the processor to perform operation comprising:
   judging whether a current page is in a read mode, wherein the judging comprises a determination that a display range of the current page does not include at least one of an image, a link, or a video;
   detecting a screen touch action of a user after judging that the current page is in the read mode, and determining a position area corresponding to the screen touch action after the screen touch action of the user is detected, wherein, the determined position area is one of at least four equally sized position areas of the display range of the current page splitting the display range of the current page into equal sized quarters, wherein a first position area is a top quarter area of the screen and corresponds to a first screen flipping operation of flipping forward by one screen, wherein a second position area is a middle quarter area of the screen directly below the first position area and corresponds to a second screen flipping operation of flipping forward by a preset percentage of the display range that is less than 100%, wherein a third position area is another middle quarter area of the screen directly below the second position area and corresponds to a third screen flipping operation of flipping backward by a preset percentage of the display range that is less than 100%, and wherein a fourth position area is a bottom quarter area of the screen directly below the third position area and corresponds to a fourth screen flipping operation of flipping backward by one screen; and
   performing one of the first, second, third, or fourth screen flipping operations according to the determined position area and a corresponding relationship between the determined position area and the One of the first, second, third, or fourth screen flipping operations.

5. The apparatus according to claim 4, wherein the operation further comprises:
   before performing screen flipping according to the determined position area, and the corresponding relationship between the position area and the screen flipping operation, splitting a screen to obtain the four position areas arranged from top to bottom of the display range of the current page, and a corresponding screen flipping operation for each position area to obtain the corresponding relationship between the position area and the screen flipping operation.

6. The apparatus according to claim 4, wherein the operation further comprises:
   displaying a margin of the at least four position areas in the form of a virtual desktop.

7. A terminal, comprising the apparatus for screen flipping comprising: at least a processor; and at least a computer readable storage medium containing instructions of programs that, when executed by the processor, cause the processor to perform operation comprising:
   judging whether a current page is in a read mode, wherein the judging comprises a determination that a display range of the current page does not include at least one of an image, a link, or a video;
   detecting a screen touch action of a user after judging that the current page is in the read mode, and determining a position area corresponding to the screen touch action after the screen touch action of the user is detected, wherein, the determined position area is one of at least four equally sized position areas of the display range of the current page splitting the display range of the current page into equal sized quarters, wherein a first position area is a top quarter area of the screen and corresponds to a first screen flipping operation of flipping forward by one screen, wherein a second position area is a middle quarter area of the screen directly below the first position area and corresponds to a second screen flipping operation of flipping forward by a preset percentage of the display range that is less than 100%, wherein a third position area is another middle quarter area of the screen directly below the second position area and corresponds to a third screen flipping operation of flipping backward by a preset percentage of the display range that is less than 100%, and wherein a fourth position area is a bottom quarter area of the screen directly below the third position area and corresponds to a fourth screen flipping operation of flipping backward by one screen; and performing one of the first, second, third, or fourth screen flipping operations according the determined position area and a corresponding relationship between the determined position area and the one of the first, second, third, or fourth screen flipping operations.

8. A terminal, comprising the apparatus for screen flipping according to claim 7, wherein the operation further comprises: before performing screen flipping according to the determined position area and the corresponding relationship between the position area and the screen flipping operation, splitting a screen to obtain the four position areas arranged from top to bottom of the display range of the current page, and a corresponding screen flipping operation for each position area to obtain the corresponding relationship between the position area and the screen flipping operation.

9. A terminal, comprising the apparatus for screen flipping according to claim 7, wherein the operation further comprises: displaying a margin of the at least four position areas in the form of a virtual desktop.

10. The method according to claim 1, wherein, the method further comprises:
 returning back to the step of judging whether the current page is in the read mode when the screen flipping operation has been completed.

11. The apparatus according to claim 4, wherein the operation further comprises:
 returning back to the step of judging whether the current page is in the read mode when the screen flipping operation has been completed.

12. The method according to claim 1, further comprising: detecting a second screen touch action comprising at feast two points of contact, wherein at least one of the two points of contact is within at feast one of the at least four position areas that corresponds to screen flipping; and responsively determining to suppress the screen flipping operation.

* * * * *